Patented Oct. 21, 1952

2,614,999

UNITED STATES PATENT OFFICE 2,614,999

SOLUTIONS OF POLYAMIDES

John R. Caldwell, Kingsport, Tenn., assignor to Eastman Kodak Company, Rochester, N. Y., a corporation of New Jersey No Drawing. Application September 22, 1949, Serial No. 117,263

5 Claims. (Cl. 260—30.6)

This invention relates to solutions or "dopes" of polyamides derived from hexamethylene diamine and adipic acid. Such polyamides and their preparation are described, for instance, in U. S. Patents 2,130,523 and 2,163,584. Only a few solvents for these polyamides have been reported in the art. These solvents include hot formic acid, hot cresol, and hot formamide. It is obvious that many technical difficulties arise when solutions must be handled at elevated temperatures.

I have discovered that clear, smooth solutions of hexamethylene diamine-adipic acid polyamides can be prepared at room temperature by mixing the polyamide with a mixture consisting of 40–50% of 85% phosphoric acid and 60–50% of an oxygen-containing lower aliphatic compound selected from the group consisting of the liquid aliphatic alcohols, ketones, ethers, and ether-alcohols, in which the number of carbon atoms does not exceed five. Suitable oxygen-containing aliphatic compounds are methanol, ethanol, the propanols, the butanols, the amyl alcohols, acetone, methyl-ethyl ketone, diethyl ketone, the methyl-propyl ketones, diethyl ether, ethylene glycol, monomethyl ether of ethylene glycol, dimethyl ether of ethylene glycol, monoethyl ether of ethylene glycol, methyl-ethyl ether of ethylene glycol, and diethylene glycol.

My novel solutions can be worked at room temperature. They are stable, and show little or no change in viscosity for a week or longer. They can be made with a relatively high content of polyamide. For general use, it is preferred to dissolve 20 to 30 parts of polyamide in 100 parts of solvent mixture, by weight. However, for some purposes it may be desirable to use dopes having a concentration above or below this range.

My novel solutions of polyamides are characterized by a high degree of stability toward aging. This is of great importance in their technical utilization, because they can be filtered, degassed, etc., without danger of any change in properties being encountered.

My novel solutions or dopes find many applications. For example, they can be used in coating or impregnating textiles for the manufacture of artificial leather. After the textile is coated or impregnated with the polyamide solution, which may contain plasticizers and pigments, it is immersed in water or a lower alcohol to precipitate the polyamide. If the precipitating liquid is cold or at room temperature, the polyamide is thrown out of solution as a flocculent or granular precipitate that remains attached to the textile fabric structure. After being washed thoroughly to remove all traces of residual solvent, the coated fabric is subjected to heat and pressure, which fuses the polyamide precipitate into a homogeneous, continuous structure that is firmly attached to the textile fabric. If hot water (90–100° C.) is used as the precipitating bath, the polyamide is thrown out of solution as a continuous, opaque film that remains attached to the textile fabric. The product is washed thoroughly to remove all traces of residual solvent.

By way of illustrating the method of carrying out my invention, I give the following examples.

*Example I.*—Fifty parts by weight of ethyl alcohol and 50 parts by weight of 85% phosphoric acid were mixed. Thirty parts by weight of a polyamide prepared from adipic acid and hexamethylene diamine and having a molecular weight of 12,000–15,000 was added, and the mixture was tumbled at room temperature for 24 hours. A clear, smooth dope was produced, which showed no change in viscosity after 6 days' storage.

*Example II.*—Fifty parts by weight of ethylene glycol monomethyl ether and 50 parts by weight of 85% phosphoric acid were mixed. Thirty parts of an adipic acid-hexamethylenediamine polyamide, of molecular weight 20,000–25,000, was dissolved in the solvent by tumbling. A smooth, clear dope was obtained that showed no change in viscosity or appearance for 8–10 days.

*Example III.*—Fifty parts by weight of methyl ethyl ketone and 50 parts by weight of 85% phosphoric acid were mixed. Thirty parts of hexamethylenediamine adipic acid polyamide was dissolved in the mixed solvent to give a clear, smooth dope that retained its viscosity for a week or longer.

What I claim as my invention and desire to be secured by Letters Patent of the United States is:

1. A solution of 20 to 30 parts by weight of a hexamethylene diamine-adipic acid polyamide in 100 parts by weight of a solvent consisting of 40–50% of 85% phosphoric acid and 60–50% of a liquid aliphatic ketone in which the number of carbon atoms does not exceed five, the solution being characterized by a stable viscosity.

2. A solution of 20 to 30 parts by weight of a hexamethylene diamine-adipic acid polyamide in 100 parts by weight of a solvent consisting of 40–50% of 85% phosphoric acid and 60–50% of an aliphatic ether in which the number of carbon atoms does not exceed five, having the formula R'OR'', in which R' and R'' are alkyl groups which may be identical, the solution being characterized by a stable viscosity.

3. A solution of 20 to 30 parts by weight of a hexamethylene diamine-adipic acid polyamide in 100 parts by weight of a solvent consisting of 40-50% of 85% phosphoric acid and 60-50% of an oxygen-containing lower aliphatic liquid compound in which the number of carbon atoms does not exceed five, selected from the group consisting of: alcohols having the formula ROH, in which R is selected from the group consisting of alkyl and hydroxyalkyl; ketones; ethers having the formula R'OR'', in which R' and R'' are alkyl groups which may be identical; and ether alcohols having the formula ROR'''OR'''', in which R is selected from the group consisting of alkyl and hydroxyalkyl, R''' is an alkylene radical, and R'''' is selected from the group consisting of hydrogen and alkyl, the solution being characterized by a stable viscosity.

4. A solution of 20 to 30 parts by weight of a hexamethylene diamine-adipic acid polyamide in 100 parts by weight of a solvent consisting of 40-50% of 85% phosphoric acid and 60-50% of an aliphatic alcohol in which the number of carbon atoms does not exceed five, having the formula ROH, in which R is selected from the group consisting of alkyl and hydroxyalkyl, the solution being characterized by a stable viscosity.

5. A solution of 20 to 30 parts by weight of a hexamethylene diamine-adipic acid polyamide in 100 parts by weight of a solvent consisting of 40-50% of 85% phosphoric acid and 60-50% of an aliphatic ether-alcohol in which the number of carbon atoms does not exceed five, having the formula ROR'''OR'''', in which R is selected from the group consisting of alkyl and hydroxyalkyl, R''' is an alkylene radical, and R'''' is selected from the group consisting of hydrogen and alkyl, the solution being characterized by a stable viscosity.

JOHN R. CALDWELL.

REFERENCES CITED

The following references are of record in the file of this patent:

UNITED STATES PATENTS

| Number | Name | Date |
|---|---|---|
| 2,130,948 | Carothers | Sept. 20, 1938 |
| 2,293,760 | Peters | Aug. 25, 1942 |
| 2,489,569 | Foulds et al. | Nov. 29, 1949 |